Aug. 20, 1935.    G. V. DOWNER    2,011,678
ILLUMINATING DEVICE
Filed March 16, 1933
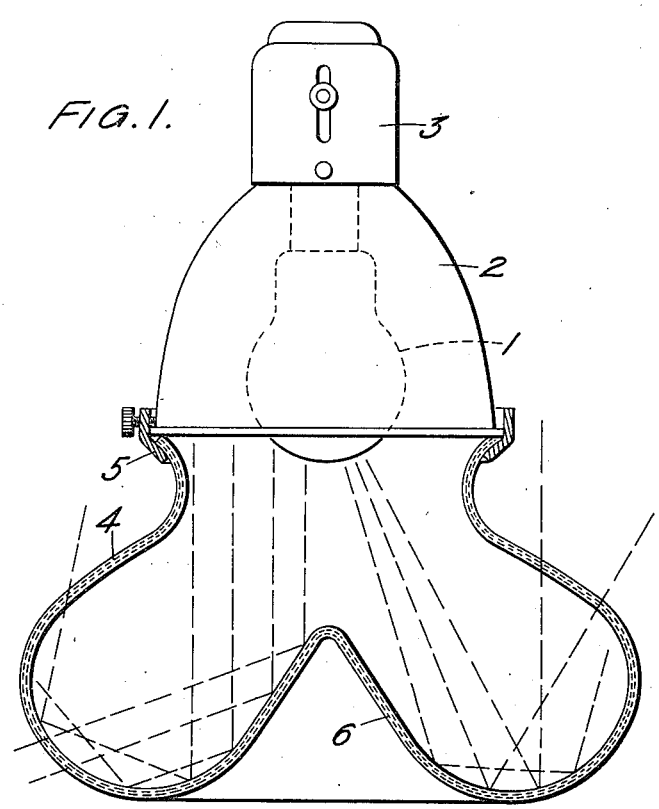
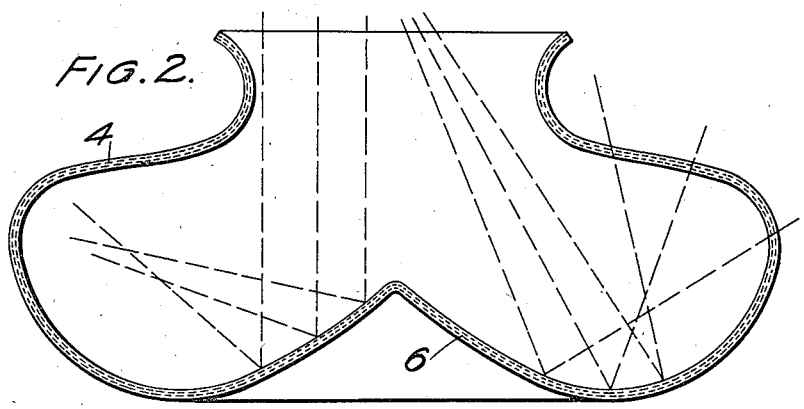

UNITED STATES PATENT OFFICE 2,011,678

ILLUMINATING DEVICE

George Victor Downer, St. Pancras, England

Application March 16, 1933, Serial No. 661,138
In Great Britain March 15, 1932

1 Claim. (Cl. 240—78)

This invention relates to devices such as reflectors and transparent or translucent diffusing screens or globes for modifying the quality or distribution of light from artificial sources of illumination, such for example as electric gas-filled lamps, electric arcs or incandescent gas mantles.

The object of the invention is to provide improved and more economical devices of this nature for obtaining an efficient illumination of any desired kind from such artificial sources and more especially for obtaining an evenly diffused light over a given area or throughout a given space with a minimum waste of light by absorption.

With this object in view the invention consists in a lighting unit comprising a reflecting canopy adapted to house a source of artificial light and to throw all or most of the light downwards or forwards in a beam, a transparent or translucent diffusing globe or bowl of greater diameter than the canopy and secured at its open edge to the edge of said canopy so as to completely enclose the source of light, and a deflector within said globe or bowl adapted to intercept most of the light from the canopy and to disperse said light by reflecting it partly outwards and partly upwards or backwards.

In the case of a pendant unit such upwardly and outwardly reflected light will of course pass through the upper and outer portion of the diffusing globe and be thereby diffused and directed towards the ceiling, or the sides of the deflector may be arranged at such an angle as to deflect the light mainly horizontally outwards.

When thus utilizing the deflector inside a diffusing globe it is desirable that the electric bulb or other light source should be entirely or almost entirely within the primary reflector or canopy and that the latter should be so designed as to reflect all the light forwards in a concentrated beam, as in flood lights and search lights. The deflector can then be placed directly in the path of the beam so as to deflect a light of maximum intensity around and/or upwards through the diffusing walls of the globe.

It will be understood that such terms as upwards and downwards are here used in relation to suspended sources of illumination, in which the light is first directed downwards, but the arrangements described are equally applicable to lamps supported on standards or on wall brackets or in any other position. Where, for instance a lamp is mounted so as to throw its light upwardly, the whole arrangement is inverted and the deflector would be used as described for deflecting some of such light downwardly and outwardly.

In applying the invention to a lighting unit intended to hang from a white ceiling and to provide a partly or mainly indirect form of illumination by reflection from the ceiling, the indentation or deflector in the diffusing globe will be designed to reflect most of the light falling on it from the canopy upwards and outwards through the upper part of the diffusing globe and on to the ceiling. In this case the diffusing globe would preferably be thin or almost transparent at the upper part thereof while the lower portion might be denser or more opaque, so that a comparatively small amount of light might pass directly through the lower part of the globe and be well diffused thereby, while most of the light would pass upwards with little loss of intensity and only slight diffusion on to the ceiling, whence it would be more evenly diffused and dispersed throughout the room in the well known manner of indirect lighting, thus providing an indirect or semi-indirect illumination of maximum efficiency.

In another case, for example, the deflecting indentation may be so formed as to reflect most of the light radially outwards and partly downwards through the sides of the diffusing globe, and a certain amount of light more directly downwards, so as to provide an evenly dispersed direct illumination extending over a considerable area beneath and around the lighting unit.

Thus it will be evident that the indentation or concavity in the diffusing globe may be of various forms in accordance with the circumstances and conditions in each particular example.

Where the indentation itself acts as the deflector it will of course be formed with a highly polished internal reflecting surface, and the glass or other material of the globe may be made either opaque, or translucent, or with any desired density and diffusing power at the indentation, according to whether much or little or no light is required to pass vertically downwards through that part of the globe.

The rest of the globe may also be given any degree of opacity or translucence or transparency in various parts according to the direction in which the greatest intensity of illumination is required and according to the desired degree of diffusion. The globe, of course, may also be of any desired shape or dimensions, provided the mouth or rim of the globe fits the mouth of the reflecting canopy so as totally to enclose the source of light therein.

The globe may be made of frosted or opal glass or quartz or any other suitable transparent or translucent material and may in some cases be coloured for special purposes. If frosted or otherwise treated on the surface to diffuse the light passing through the globe, such treatment should preferably be applied to the outer surface of the globe, leaving the inner surface smooth to provide adequate internal reflecting power so that much of the light will be several times reflected in various directions and thus well dispersed and distributed before passing through the walls of the globe.

In the accompanying drawing:

Fig. 1 is a diagrammatic vertical sectional view of a pendant electric lighting unit in accordance with the invention, and Fig. 2 illustrates a modification.

Referring to Fig. 1, an electric lamp 1 is housed in a reflecting canopy 2 and mounted on a focussing gallery 3 by means of which the position of the lamp in the canopy may be adjusted. A glass diffusing bowl or globe 4 is attached to the edge of the canopy 2 by any suitable means, such as a brass ring 5 by which the unit may be suspended by chains or the like. As shown, the diameter of the globe at its lower part is considerably greater than that of the canopy, so that the globe projects well beyond the canopy all round the latter. The under surface of the globe is formed as a conical indentation constituting a deflector 6. As shown by the dotted lines, rays of light falling on the deflector 6 from the lamp 1 or canopy 2 are reflected outwardly by said deflector in various directions depending on the angle of incidence and the portion of the deflector on which the ray falls. A considerable proportion of the light is reflected upwardly through the upper walls of the globe, a certain amount being even reflected back past the canopy towards the point of support on the ceiling; other rays are reflected substantially horizontally outwards, and others are reflected downwards and outwards. A certain amount of light will be reflected and re-reflected several times from the inner surface of the globe and a certain amount will also pass directly from the lamp or canopy through the walls of the globe. The result is that a very even and well diffused light is thrown on the ceiling walls and floor in all directions, and there is no wasteful pool of light on the ceiling or on the floor nor are there any light or dark patches thrown on the ceiling, floor or walls.

Fig. 2 shows a modified form of globe and deflector, the globe projecting further laterally and the deflector having a more obtuse angle; the effect being to throw a greater proportion of the light upwardly on to the ceiling.

I claim:—

A lighting unit comprising a reflecting canopy, a source of light within said canopy, and a hollow translucent diffusing member of considerably greater diameter than said canopy at its portion distant from said canopy and secured to said canopy so as to completely enclose the source of light, said translucent member and said canopy having a common central axial line, and said translucent member in central axial cross-section being of the general form of two duplicate U-shape loops with their individual axes intersecting at said common axial line and with their adjacent sides intersecting and forming a deflector with its center coincident with said common axial line to intercept most of the light beam and to disperse the same by reflecting it radially outwardly at various angles, partly downwardly and partly upwardly, some of the upwardly reflected light being re-reflected by the inner surface of said translucent member distant from said deflector in the direction of said common axial line and beyond and behind said canopy, said deflector also permitting some of the light to pass directly therethrough.

GEORGE VICTOR DOWNER.